United States Patent
Kumar

(10) Patent No.: US 11,752,958 B2
(45) Date of Patent: Sep. 12, 2023

(54) SYSTEMS AND METHODS FOR PROVIDING POWER TO SENSORS

(71) Applicant: Transportation IP Holdings, LLC, Norwalk, CT (US)

(72) Inventor: Ajith Kuttannair Kumar, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 224 days.

(21) Appl. No.: 17/231,865

(22) Filed: Apr. 15, 2021

(65) Prior Publication Data
US 2021/0370856 A1    Dec. 2, 2021

Related U.S. Application Data

(60) Provisional application No. 63/031,450, filed on May 28, 2020.

(51) Int. Cl.
| | | |
|---|---|---|
| *B60R 16/03* | (2006.01) | |
| *G01P 3/44* | (2006.01) | |
| *G08C 17/02* | (2006.01) | |

(52) U.S. Cl.
CPC .............. *B60R 16/03* (2013.01); *G01P 3/44* (2013.01); *G08C 17/02* (2013.01)

(58) Field of Classification Search
CPC ........... B60R 16/03; G01P 3/44; G08C 17/02; H02J 50/001; H02J 50/005; H02J 2310/48; H02J 50/10
See application file for complete search history.

(56) References Cited

U.S. PATENT DOCUMENTS

| | | | |
|---|---|---|---|
| 8,228,008 B2 | 7/2012 | Kitanaka | |
| 8,796,991 B2 | 8/2014 | Ohtomo | |
| 9,067,500 B2 | 6/2015 | Penev | |
| 9,284,935 B2 | 3/2016 | Kamachi | |
| 10,018,613 B2 | 7/2018 | Potyrailo | |
| 10,379,559 B1 | 8/2019 | Briancon et al. | |
| 10,523,058 B2 | 12/2019 | Leabman | |
| 11,137,421 B1* | 10/2021 | Parker | G01R 15/181 |
| 2009/0015196 A1* | 1/2009 | Baxter | H02J 50/001 |
| | | | 320/108 |

(Continued)

FOREIGN PATENT DOCUMENTS

DE    102012102587 A1    10/2012

OTHER PUBLICATIONS

Office Action dated Sep. 13, 2022 for corresponding Eurasian Patent Application 202191135/31 (5 pages).

(Continued)

*Primary Examiner* — Christopher P McAndrew
*Assistant Examiner* — Zannatul Ferdous
(74) *Attorney, Agent, or Firm* — The Small Patent Law Group LLC; William Breeze

(57) ABSTRACT

A system includes an alternating current (AC) power component, a cable, a sensor transformer, and a sensor. The cable is coupled to the AC power component and is can conduct current to the AC power component. The sensor transformer includes a coil disposed proximate to the cable. The coil generates an induced voltage responsive to conduction of the current through the cable. The sensor is coupled to the sensor transformer and receives power from the sensor transformer. The sensor obtains information corresponding to operation of the AC power component.

25 Claims, 6 Drawing Sheets

(56) References Cited

U.S. PATENT DOCUMENTS

| | | | |
|---|---|---|---|
| 2010/0253318 A1* | 10/2010 | Thomas, Sr. | H01F 38/30 |
| | | | 323/358 |
| 2014/0060378 A1* | 3/2014 | Daigle | B60L 50/53 |
| | | | 105/35 |
| 2015/0028019 A1* | 1/2015 | Kamachi | B60L 53/62 |
| | | | 219/484 |
| 2018/0201139 A1 | 7/2018 | Dames et al. | |
| 2018/0340986 A1* | 11/2018 | Latham | G01D 5/145 |
| 2020/0070906 A1 | 3/2020 | Laperle et al. | |

OTHER PUBLICATIONS

Examination report No. 2 dated Aug. 2, 2022 for corresponding Australian Patent Application 2021202998 (3 pages).
Examination report No. 3 dated Oct. 31, 2022 for corresponding Australian Patent Application 2021202998 (3 pages).
Patent Search Report from corresponding Eurasian application No. 202191135, dated Oct. 12, 2021, 3 pages.
Translated Patent Search Report from corresponding Eurasian application No. 202191135, dated Oct. 12, 2021, 1 page.
Search Report dated Nov. 19, 2021 for corresponding European Application No. 21174313.3-1202 (8 pages).
First Examination Report dated May 13, 2022 for corresponding Australian Patent Application 2021202998 (3 pages).
Office action dated May 20, 2022 for corresponding Eurasian Application No. 202191135 (4 pages).
Search Report dated Oct. 19, 2021 for corresponding European Application No. 21174313.3 (8 pages).
Office Action dated Feb. 14, 2023 for corresponding Eurasian Patent Application 202191135/31. English translation provided (4 pages).

* cited by examiner

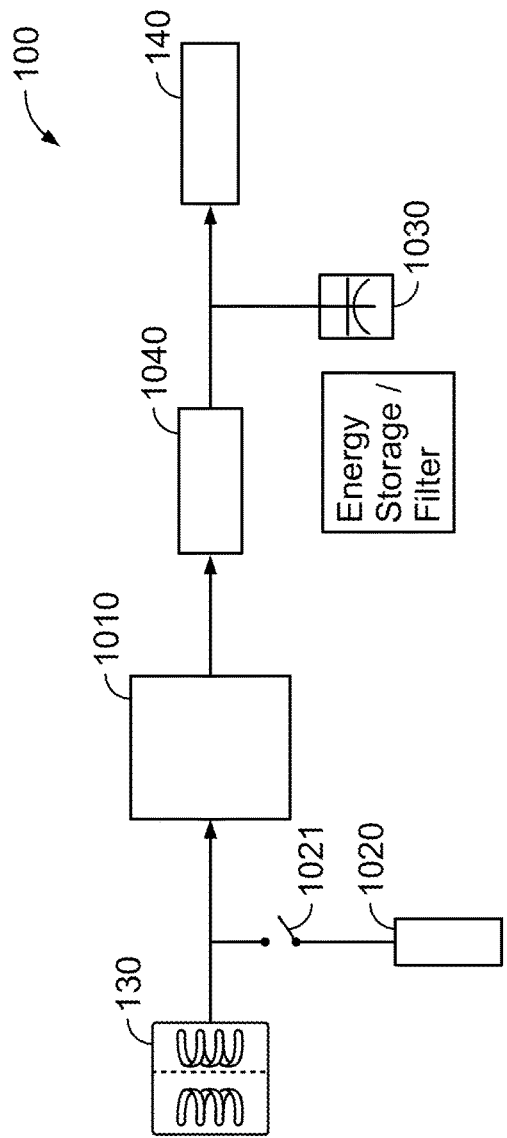
FIG. 10
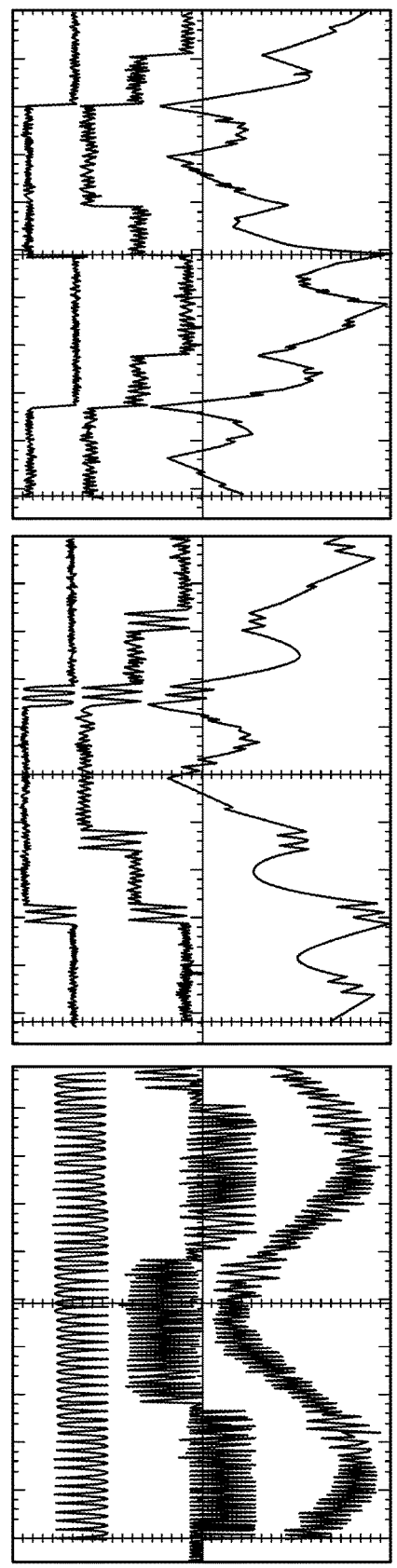
FIG. 11A
FIG. 11B
FIG. 11C

SYSTEMS AND METHODS FOR PROVIDING POWER TO SENSORS

RELATED APPLICATIONS

This application claims priority to U.S. Provisional Application No. 63/031,450, filed on 28 May 2020 and entitled "Systems and Methods for Providing Power to Sensors," the entire disclosure of which is incorporated by reference.

BACKGROUND

Technical Field

The subject matter described relates to systems and methods for use in providing power to sensors, for example sensors of a vehicle.

Discussion of Art

Alternating current (AC) power components may be used in a variety of applications. For example, AC traction motors may be used in connection with vehicle propulsion. Such components may have a number of sensors associated with them. Providing power to sensors in such applications may encounter a number of challenges. For example, if power is provided to individual sensors via cables from a remote source, the associated cables may be expensive, and difficult to route. Such cables may result in increased complexity and expense of assembling and maintaining systems (e.g., vehicles). If batteries are used, the batteries may provide undesirable additional weight. For example, in vehicle applications, the extra weight of batteries may result in additional wear on related components. Further, in order to preserve battery life, information from sensors may be provided intermittently, resulting in periods of time where sensor information is not known. These batteries also need periodic replacement and have performance impact based on ambient conditions. It may be desirable to have systems and methods that differ from those that are currently available.

BRIEF DESCRIPTION

In one embodiment, a system may include an alternating current (AC) power component, a cable, a sensor transformer, and a sensor. The cable is coupled to the AC power component and can conduct current to the AC power component. The sensor transformer may include a coil disposed proximate to the cable. The coil generates an induced voltage responsive to conduction of the current through the cable. The sensor is coupled to the sensor transformer and receives sensor power from the sensor transformer. The sensor obtains information corresponding to operation of the AC power component.

In one embodiment, a method may include conducting current to an alternating current (AC) power component via a cable. The method may include generating a sensor power signal with a sensor transformer responsive to the current conducted to the AC power component via the cable. Further, the method may include transmitting the sensor power signal to a sensor. The method may include obtaining information corresponding to operation of the AC power component with the sensor.

In one embodiment, a system may include a drive assembly, a cable, a sensor transformer, and a sensor. The drive assembly may include a traction motor. The cable is coupled to the traction motor and can conduct current to the traction motor. The sensor transformer may include a coil disposed proximate to the cable. The coil generates an induced voltage responsive to conduction of the current through the cable. The sensor transformer is mounted to the drive assembly proximate the cable. The sensor is coupled to the sensor transformer and receives power from the sensor transformer. The sensor is mounted to the drive assembly and can obtain information corresponding to operation of the drive assembly.

BRIEF DESCRIPTION OF THE DRAWINGS

The inventive subject matter may be understood from reading the following description of non-limiting embodiments, with reference to the attached drawings, wherein below:

FIG. 10 provides an electrical schematic view of an example system;
FIG. 11A provides an illustration of traction motor current at low speed;
FIG. 11B provides an illustration of traction motor current at intermediate speed;
FIG. 11C provides an illustration of traction motor current at high speed.

DETAILED DESCRIPTION

Embodiments of the subject matter described herein relate to systems and methods for providing power to sensors. For example, various embodiments relate to the use of a sensor transformer located proximate to a corresponding sensor and providing power to the sensor. The sensor transformer in various embodiments is disposed proximate a cable of an AC power component, and generates an induced voltage responsive to power running through the cable. In some embodiments, the power for a sensor may be generated relatively close to the sensor, without the need for lengthy, costly, and complex wiring runs and/or may reduce or eliminate undesirable weight and/or longevity issues associated with solar panels, batteries, or other energy storage devices.

While various examples herein may be discussed in connection with rail vehicles, not all embodiments described herein relate to rail vehicle systems. Suitable vehicles may include automobiles, trucks, buses, mining vehicles, marine vessels, aircraft, agricultural vehicles, and the like. And, while embodiments of the invention may be applied to stationary applications, most stationary applications do not have the same constraints and challenges associated with vehicles such that the heavy battery systems, and grid connectivity may be more appropriate.

Figure 1:
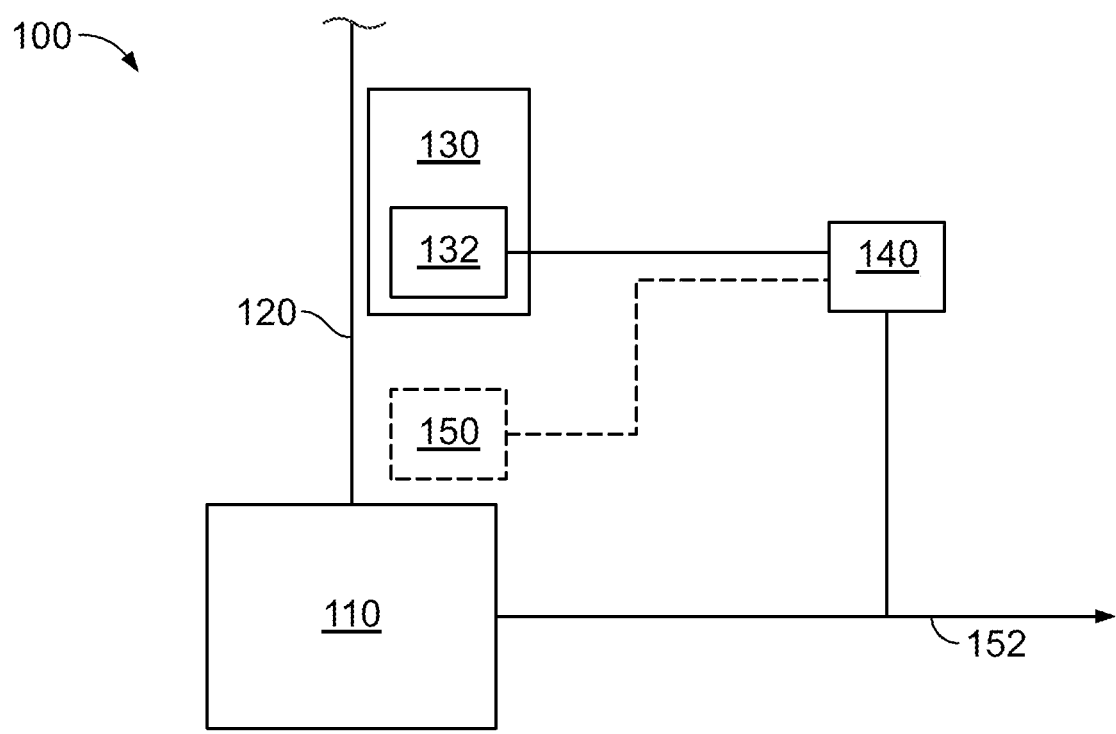
FIG. 1 illustrates a block schematic diagram of a system.

FIG. 1 illustrates a schematic diagram of a system 100. The depicted system 100 may include an alternating current (AC) power component 110, a cable 120, a sensor transformer 130, and a sensor 140. The cable is coupled to the AC power component, and provides current to the AC power component. In various embodiments, the sensor transformer may generate a voltage responsive to current moving through the cable, and thereby may provide power to the sensor.

The sensor transformer may include a coil 132. While the coil is represented as a single block in FIG. 1, multiple coils may be used in various embodiments. The coil may be disposed proximate the cable and may generate an induced voltage responsive to conduction of current through the cable. With regard to distances between the cable and the sensor transformer, the sensor transformer in various embodiments may be located within a few centimeters or less of the cable. The sensor transformer in various embodiments may be mounted on or near the AC power component (or an assembly including the AC power component) and relatively close to the sensor. A suitable sensor transformer may be a device used to acquire, generate, or receive sensor power to be transferred to the sensor, and may be selected based at least in part on application specific criteria.

In one embodiment, the sensor may be coupled to the sensor transformer (e.g., via a wire or cable) and may receive sensor power from the sensor transformer. The sensor may be mounted relatively near the sensor transformer. For example, the sensor may be within 10-20 feet of the sensor transformer in various embodiments. The sensor can obtain information corresponding to operation of the AC power component. With the proper sensor selection, the sensor may detect one or more of temperature, fluid level, vibration, or frequency content of a signal, among others. This may be done while providing sensor power to the sensor. Information corresponding to operation of the AC power component may include information regarding related components. For example, in embodiments where the AC power component is a traction motor, information corresponding to operation of the traction motor may include information regarding associated axles, gears, bearings, and the like. For example, information corresponding to operation of a traction motor may include gear case oil level, information regarding operation of motor bearings, etc.

While one block is used to represent sensor in FIG. 1, multiple sensors may be used in various embodiments. Each sensor may have a dedicated sensor transformer, or one sensor transformer may provide sensor power to multiple sensors, depending on conditions of a particular application, for example amounts of sensor power required, locations available for sensor transformers, and distance and routing options between transformers and sensors.

Figure 2:
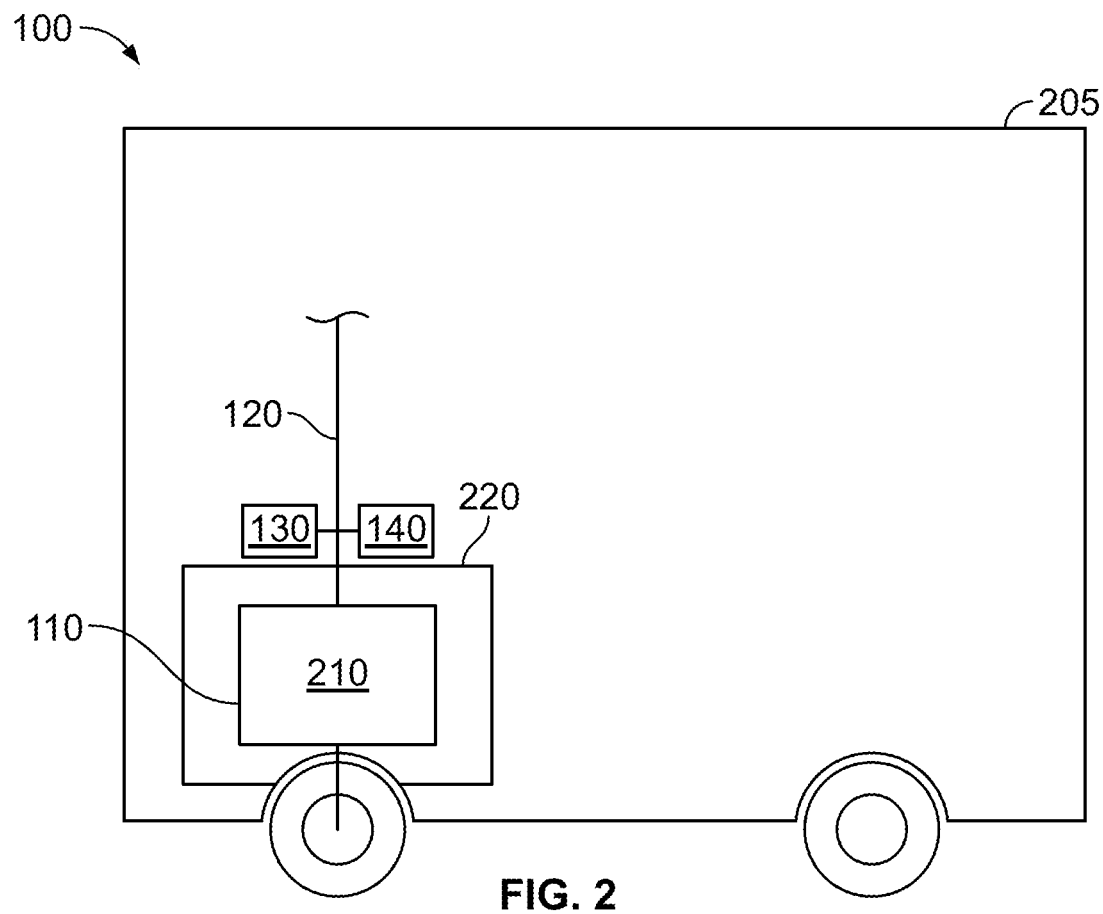
FIG. 2 provides a schematic view of a vehicle.

In various embodiments, the AC power component may be disposed on a vehicle. FIG. 2 provides a schematic view of an example system in which an AC power component may be disposed on a vehicle 205. The vehicle in the illustrated embodiment is a rail vehicle (e.g., locomotive). The AC power component is a traction motor 210. As seen in FIG. 2, the depicted traction motor is part of a drive assembly 220. The sensor transformer and the sensor are both mounted to the drive assembly.

Figure 3:
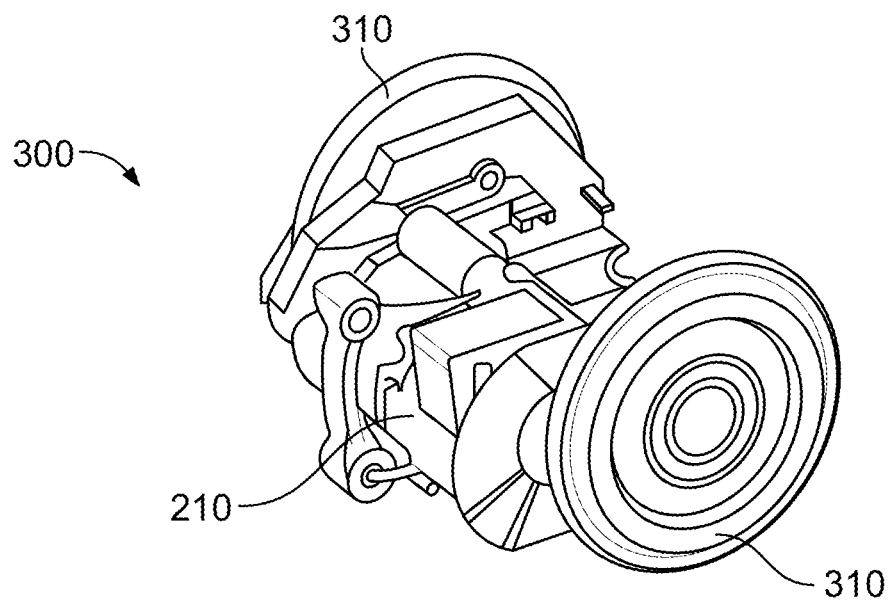
FIG. 3 provides a perspective view of a motor assembly.
Figure 4:
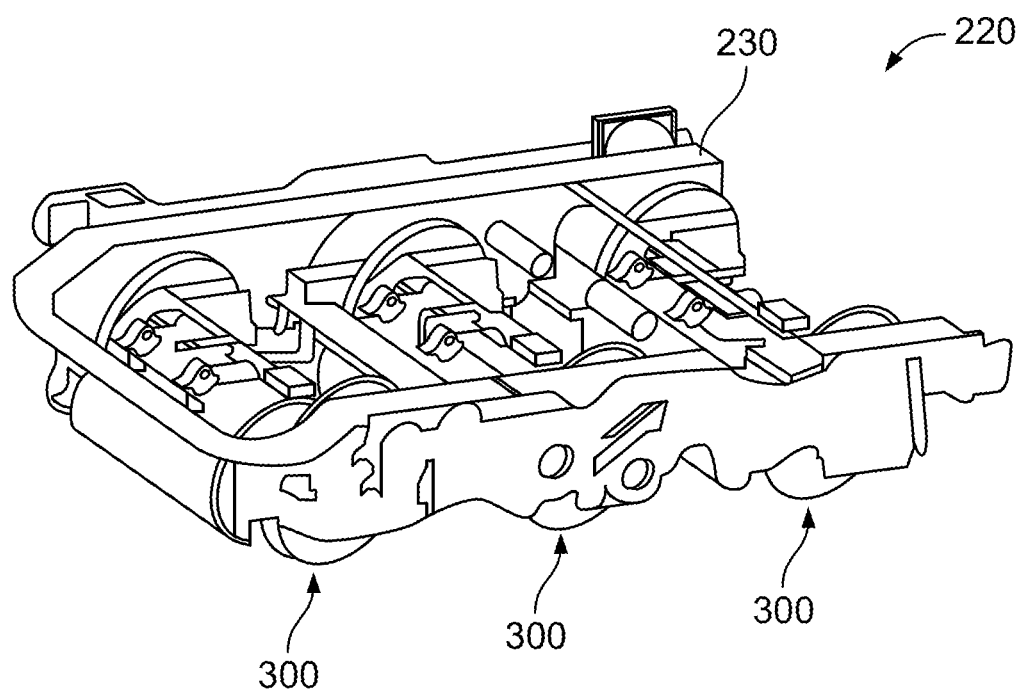
FIG. 4 provides a perspective view of a drive assembly that includes the motor assembly of FIG. 3.

In one embodiment, the drive assembly may include multiple traction motors 210. For example, FIG. 3 provides a perspective view of a motor assembly 300 that may include the traction motor and wheels 310. FIG. 4 provides a perspective view of a drive assembly that may include a truck 230 and three motor assemblies. In various embodiments, a sensor transformer mounted to one motor assembly may provide sensor power to plural sensors on one or more other motor assemblies of the truck.

Figure 5:
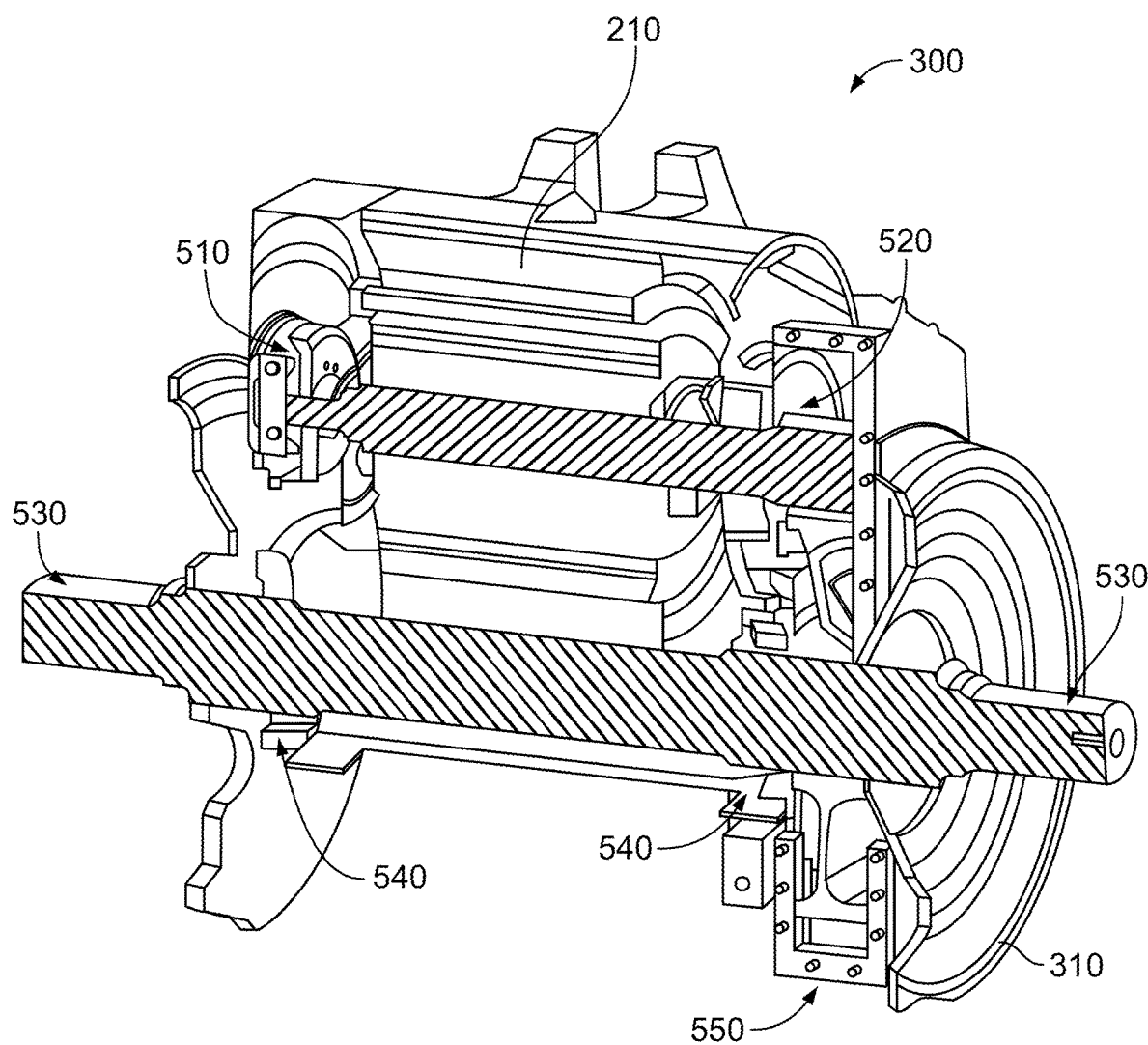
FIG. 5 provides a sectional view of the motor assembly of FIG. 3.

Sensors may be placed at or near various locations of the drive assembly to detect various properties (e.g., temperature, fluid level, vibration) associated with one or more components or aspects of the drive assembly. For example, FIG. 5 provides a sectional view of the motor assembly. The motor assembly may include various bearings—a motor non-pinion end rolling element bearing 510, a motor pinion end rolling element bearing 520, axle rolling element bearing locations 530, and U tube rolling element bearings 540. The motor assembly may include a gear case 550 and associated gears. Sensors may be disposed proximate to corresponding bearing locations, gears, and/or the gear case to detect one or more properties or conditions associated with the bearings, gears, and/or the gear case.

Figure 6:
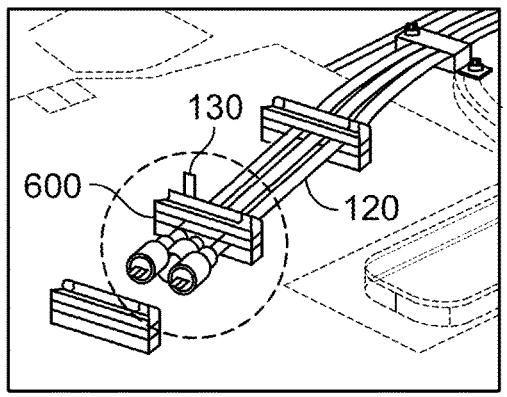
FIG. 6 provides a perspective view of an example cable that passes through a cleat.

As discussed herein, the sensor transformer is located proximate to the cable (e.g., close enough to the cable to generate a sufficient amount of sensor power for the sensor). The amount of sensor power required for sensor operation may be very small relative to the higher current and power utilized by the AC power component, so that the providing of sensor power to the sensor via the sensor transformer does not have a meaningful effect on operation of the AC power component. For example, traction motors can have power ratings of more than 100 kiloWatts whereas sensor requirements may be several milliwatts. In various embodiments, the sensor transformer may be mounted to a component or device that secures and/or routes the cable. For example, FIG. 6 provides a perspective view of an example cable that passes through a cleat 600. The cleat, for example, may be mounted to a drive assembly (e.g., motor assembly). As seen in the depicted example of FIG. 6, the sensor transformer is mounted to the cleat. In some embodiments, the sensor transformer may form the cable cleat. A three cable system is shown in FIG. 6, but, in other embodiments a single cable (or any other number of cable) system may be employed.

Figure 7:
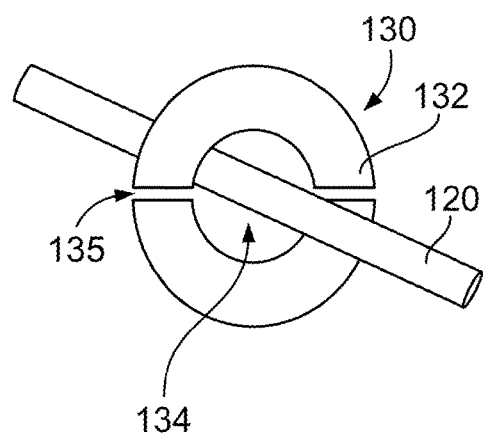
FIG. 7 provides a perspective view of an example coil that has an opening through which a cable passes.
Figure 8:
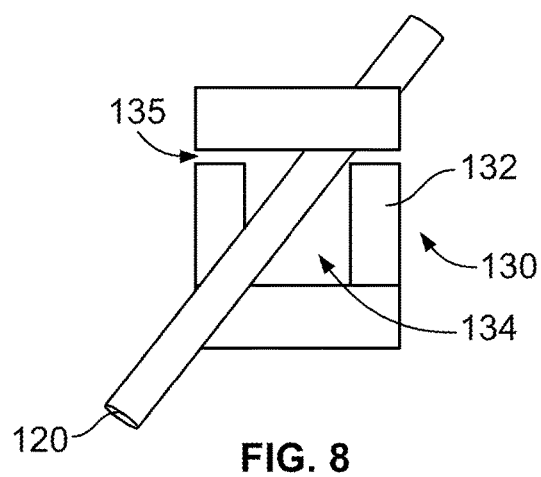
FIG. 8 provides a perspective view of another example coil that has an opening through which the cable passes.

Various coil arrangements may be employed by sensor transformers in various embodiments. For example, in some embodiments, the sensor transformer defines an opening 134 through which the cable passes. FIG. 7 provides a perspective view of an example coil that has an opening through which the cable passes. FIG. 8 provides a perspective view of another example coil that has an opening through which the cable passes. The example coils of FIGS. 7 and 8 are both examples of split-core transformers having gaps 135 between core portions. In other embodiments, a solid core transformer having an opening may be employed.

Figure 9:
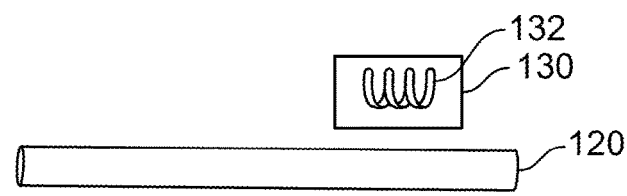
FIG. 9 illustrates an example coil through which the cable does not pass.

In still other embodiments, the cable may not pass through the coil. For example, FIG. 9 illustrates an example coil that is disposed near a cable, but the cable does not pass through the coil.

FIG. 10 provides an electrical schematic view of aspects of an example system showing connections between the sensor transformer, sensor, and various components. As seen in the illustrated example, the system may include a band pass filter 1010 that is interposed between the sensor transformer and the sensor. Current from the sensor transformer to the sensor is first filtered by the band pass filter, so that only current at selected frequencies is provided to the sensor.

As seen in FIG. 10, the system may include a load element 1020. The load element 1020 may be coupled to the sensor transformer (e.g., via switch 1021), and can dissipate excess current or voltage (e.g., current in excess of a rating of the sensor, or current when an energy storage device selectively coupled to the sensor is full or above a threshold value). For example, when current is not required or desired for the sensor, the switch may be closed to allow current to flow from the sensor transformer to the load element. However, when current is desired for the sensor, the switch may be opened to prevent current from being directed to the load element.

The depicted example system of FIG. 10 may include a storage element 1030. The storage element in various embodiments may be a capacitor, or, as another example, a battery. The storage element may be coupled to the sensor. When current from the sensor transformer is available, the storage element may be charged, and when current from the sensor transformer is not available, the storage element may be used to provide sensor power to the sensor. For example, in a first state of operation of the AC power component when sensor power from the sensor transformer coil is readily available, the storage element may be charged, with the stored energy later used for the sensor at a time when sensor power is not being derived from the AC power component and therefore is not as readily available. In one embodiment, the storage element may store sufficient energy for a relatively short amount of time (e.g., 8 hours), allowing for a relatively small and lightweight capacitor (e.g., relative to larger, heavier storage devices such as batteries which may provide power for relatively long time periods such as months and years) to be utilized for storage.

Further, the depicted example system of FIG. 10 may include a rectifier 1040. The rectifier may be interposed between the sensor transformer and the sensor, and converts alternating current from the sensor transformer to a direct current provided to the sensor. The load element and switch can be placed in other suitable locations as well in various embodiments, for example after the filter or at the output of the rectifier.

As mentioned above, current from the sensor transformer to the sensor may be provided at selected frequencies (e.g., via band pass filter). For example, in some embodiments, the system may use a harmonic portion of the current passing through the cable. The harmonic frequency (or other desired frequency) may be selected (e.g., via band pass filter) so that sensor is provided current during a desired state of operation to limit intrusiveness on operation, with power for the sensor being stored in a capacitor until desired state of operation is reached again. FIG. 11A provides an illustration of traction motor current at low speed, FIG. 11B provides an illustration of traction motor current at intermediate speed, and FIG. 11C provides an illustration of traction motor current at high speed. As seen in FIGS. 11B and 11C, as speed increases, the signal becomes generally sinusoidal with relatively large harmonics. As the current for a traction motor may be thousands of amps, and a sensor may require a relatively small number of milliamps, it is possible to divert enough power from the traction motor to power one or more sensors without meaningful effect on the traction motor. Further, as discussed herein, sensor power may be selectively directed to the sensor(s), e.g., at one or more predetermined frequency or range of frequencies. For example, in various embodiments, a fundamental portion of the signal may be utilized, while in other embodiments only harmonics may be utilized (e.g., switching frequency, or a specific harmonic such as a $5^{th}$ harmonic). In other embodiments, the total current may be utilized, or a band of frequencies (e.g., 400-1000 Hz). While FIGS. 11A, 11B, 11C show a 3 phase AC motor, a DC motor with a chopper ripple or another motor, such as one which has current variation, may be used in other embodiments.

With reference to FIG. 1, the sensor receives sensor power in various embodiments from a wire or cable from the sensor transformer. The sensor acquires information, and in various embodiments transmits the acquired information to a remote recipient. For example, the sensor in various embodiments is located on a drive assembly of a vehicle and it transmits acquired or detected information to a cab of a vehicle. The sensor may receive information or commands from the remote location (e.g., cab of the vehicle).

In some embodiments, the sensor may wirelessly communicate with a remote source. For example, using sensor power provided by the sensor transformer, the sensor may transmit information. In the illustrated example of FIG. 1, the sensor wirelessly communicates with a remote source (e.g., cab of vehicle) via a wireless receiver 150. The sensor may be disposed proximate to the AC power component. For example, the wireless receiver may be communicatively coupled to the sensor and mounted, for example, to a drive assembly (e.g., motor assembly).

In other embodiments, the wireless receiver may not be employed. For example, as shown in FIG. 1, the sensor may communicate with a remote location using a wired connection 152. The wired connection, for example, may be a speed sensor cable of a traction motor assembly, with the sensor able to transmit over the speed sensor cable. Other types of sensor cables may be utilized in alternate embodiments based in part on the end use parameters.

In various embodiments multiple AC power components may be utilized. For example, multiple traction motors may be utilized. (See, e.g., FIG. 4 and related discussion.) Each AC power component in various embodiments has one or more corresponding sensor transformers (and, in turn, one or more corresponding sensors). The system may (e.g., have a processing unit configured to) identify a particular one of the AC power components based on a signature frequency of the particular AC power component. For example, each AC power component may operate at a particular frequency (or range) unique to it in comparison to the other AC power components. Additionally or alternatively, the system may include a controller that can identify a particular AC power component based on a selective provision of power to the particular AC power component. For example, motive power may be provided to only one AC power component (or selected AC power components) at a particular time. Using the identified AC power component, the system may then identify which sensor information being received is associated with which particular AC power component.

In one embodiment, a controller is provided that communicates with at least one sensor transformer and one sensor. In one embodiment, the controller may communicate with plural sensor transformers, plural sensors, or both. The controller further may communicate with a vehicle controller. Various sensor transformers may provide sensor power when voltages are passed through their respective cables. Whether it is charging energy storage devices (for powering sensors) or directly powering sensors, not all cables may be inducing sensor power generation in the sensor transformers all of the time. As such, the controller may selectively route sensor power generated by one of a plurality of sensor transformers to one or more sensors. Which sensors, and which communication devices to transmit data back, may be programmed into the controller, and that selection may be made, in one example, based at least in part on which cables are transmitting current (and thus which sensor transformers are generating sensor power). In one embodiment, the controller may even influence a vehicle controller based at least in part on the sensor readings themselves, which sensor transformers are generating sensor power, and/or how much power the sensor transformers are providing. Naturally, the amount of sensor power the sensor transformer may generate can be influenced by the nature and amount of current passing through its respective cable.

Figure 12:
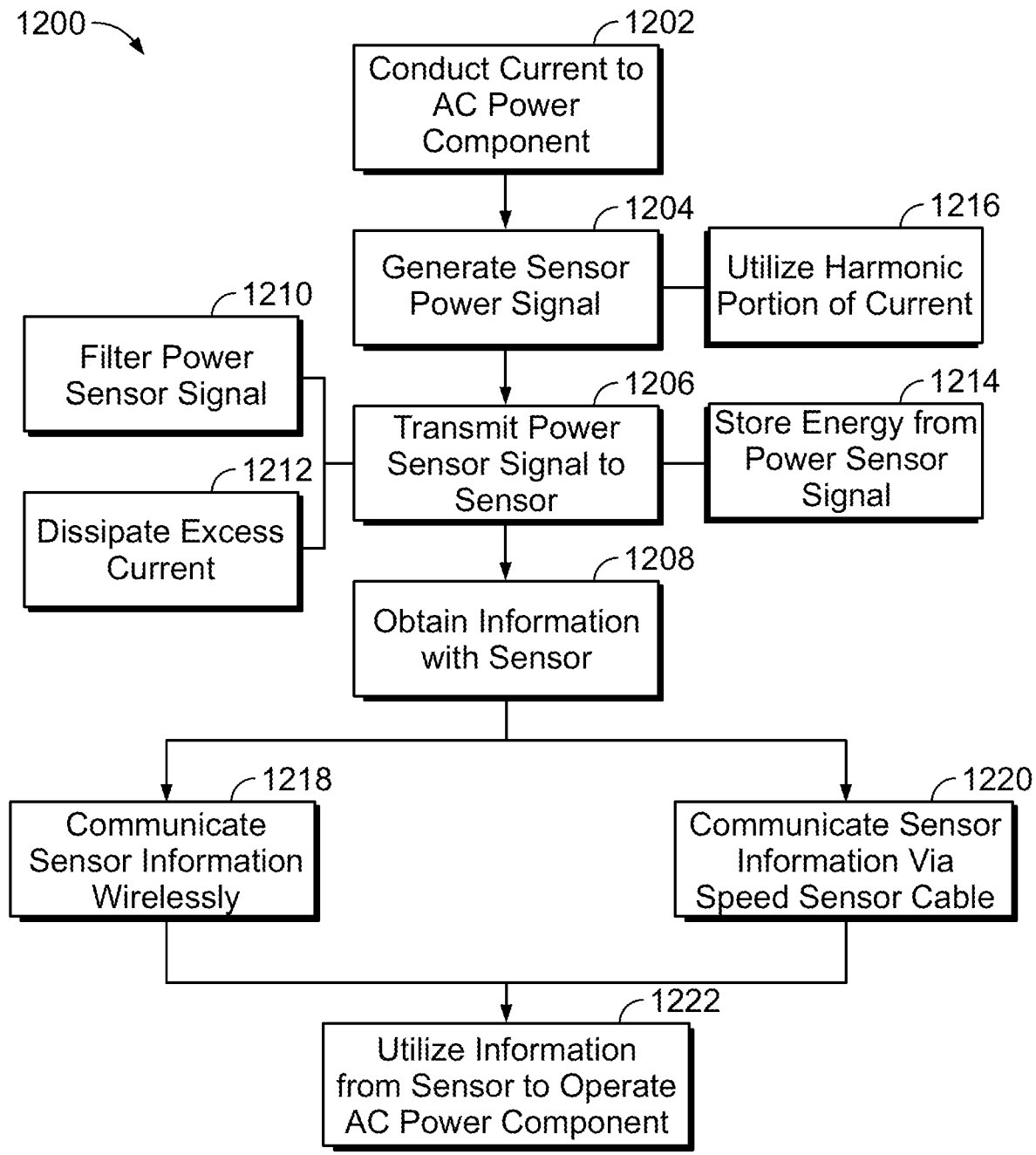
FIG. 12 illustrates a flowchart of a method.

FIG. 12 illustrates a flowchart of a method 1200 (e.g., a method for providing sensor power to a sensor). The operations of FIG. 12 may be implemented by a controller having one or more processors executing program instructions stored in memory. The method, for example, may employ structures or aspects of various embodiments (e.g., systems and/or methods) discussed herein, such as the system. In various embodiments, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method may be used as one or more algorithms to direct hardware to perform one or more operations described herein. Other methods may be used in accordance with embodiments herein.

At step 1202, current is conducted to an AC power component (e.g., traction motor) via a cable. The current may be an operational current provided to the AC power component in connection with utilization of the AC power component to perform a desired task or mission.

At step 1204, a sensor power signal is generated. In the illustrated embodiments, the sensor power signal is generated using a sensor transformer, with the sensor power signal generated responsive to the current conducted to the AC component via the cable. In various embodiments, the sensor transformer may include a coil disposed proximate (e.g., surrounding or alongside) the cable, with the coil generating an induced voltage responsive to current passing through the cable. All or a portion of the current cable may be utilized to generate the sensor power signal. In the illustrated example, at step 1216, a harmonic portion of the current is utilized to generate the sensor power signal.

At step 1206, the sensor power signal is transmitted to a sensor. The signal may be processed or modified before reception by the sensor. For example, at step 1210, the sensor power signal is filtered. In various embodiments, the signal is filtered with a band pass filter that is interposed between the sensor transformer and the sensor. As another example, at step 1212, excess current of the sensor power signal may be dissipated. As discussed herein, a load element coupled to the sensor transformer may be utilized to dissipate the excess current. Further, at step 1214 of the illustrated example, energy from the sensor power signal is stored. The energy may be stored by a capacitor coupled to the sensor.

At step 1208, information is obtained by the sensor. The information corresponds to operation of the AC power component. For example, in some embodiments the AC power component is a traction motor, and the sensed information may include temperature and/or fluid levels associated with one or more bearings.

The information acquired with the sensor may be transmitted to a remote processor or other recipient (e.g., located in the cab of a vehicle) either wirelessly or via a wired connection. For example, at 1218, sensor information is communicated wirelessly (e.g., via a wireless receiver disposed proximate the sensor) to a remote source. As another example, at step 1220, sensor information is communicated via a speed sensor cable.

At step 1222, the received information is utilized to help operate the AC power component. For example, properties or conditions detected by the sensor may be used to monitor the performance of the AC power component and make appropriate adjustments to the operation of the AC power component. In embodiments utilizing multiple AC power components, a particular AC power component corresponding to a given sensor may be identified using a signature frequency and/or selective operation of the AC power component as discussed herein.

In one embodiment, a system may include an alternating current (AC) power component, a cable, a sensor transformer, and a sensor. The cable is coupled to the AC power component, and can conduct current to the AC power component. The sensor transformer may include a coil disposed proximate to the cable and generating an induced voltage responsive to conduction of the current through the cable. The sensor is coupled to the sensor transformer and receives sensor power from the sensor transformer. The sensor can obtain information corresponding to operation of the AC power component.

Optionally, the AC power component is disposed on a vehicle. For example, the AC power component may be a traction motor of the vehicle. For instance, the traction motor may be part of a drive assembly including the traction motor and a truck, with the sensor transformer and sensor mounted to the drive assembly.

Optionally, the sensor transformer defines an opening through which the cable passes. For example, the sensor transformer may be a split-core transformer.

Optionally, the sensor transformer includes a coil disposed proximate the cable, and the cable does not pass through the coil.

Optionally, the system further includes a band pass filter interposed between the sensor transformer and the sensor.

Optionally, the system further includes a storage element coupled to the sensor.

Optionally, the system further includes a rectifier interposed between the sensor transformer and the sensor.

Optionally, the system can use a harmonic portion of the current passing through the cable.

Optionally, the system includes a plurality of AC power components having associated corresponding sensor transformers, and can identify a particular AC power component based on a selective provision of power to the particular AC power component.

Optionally, the system includes a plurality of AC power components having associated corresponding sensor transformers, and can identify a particular AC power component based on a signature frequency of the particular AC power component.

Optionally, the sensor is configured to wirelessly communicate with a remote source, Optionally, the sensor is configured to communicate with a remote source via a speed sensor cable.

In one embodiment, a method may include conducting current to an alternating current (AC) power component via a cable. The method may include generating a sensor power signal with a sensor transformer responsive to the current conducted to the AC power component via the cable. Further, the method may include transmitting the sensor power signal to a sensor. The method may include obtaining information corresponding to operation of the AC power component with the sensor.

Optionally, the method may include filtering the sensor power signal with a band pass filter interposed between the sensor transformer and the sensor.

Optionally, the method may include dissipating excess current of the sensor power signal with a load element coupled to the sensor transformer.

Optionally, the method may include storing energy from the sensor power signal with a storage element coupled to the sensor.

Optionally, the method may include using a harmonic portion of the current provided to the AC power component to generate the sensor power signal.

Optionally, a system may include a plurality of AC power components having associated corresponding sensor transformers, and the method may include identifying a particular AC power component based on a selective provision of power to the particular AC power component.

Optionally, a system may include a plurality of AC power components having associated corresponding sensor transformers, and the method may include identifying a particular AC power component based on a signature frequency of the particular AC power component.

Optionally, the method may include wirelessly communicating information between the sensor and a remote source via a wireless receiver disposed proximate the AC power component.

Optionally, the method may include communicating information between the sensor and a remote source via a speed sensor cable.

In one embodiment, a system may include a drive assembly, a cable, a sensor transformer, and a sensor. The drive assembly may include a traction motor. The cable is coupled to the traction motor and can conduct current to the traction motor. The sensor transformer may include a coil disposed proximate to the cable. The coil generates an induced voltage responsive to conduction of the current through the cable. The sensor transformer is mounted to the drive assembly proximate the cable. The sensor is coupled to the sensor transformer and receives power from the sensor transformer. The sensor is mounted to the drive assembly and can obtain information corresponding to operation of the drive assembly.

As used herein, the terms "processor" and "computer," and related terms, e.g., "processing device," "computing device," and "controller," may be not limited to just those integrated circuits referred to in the art as a computer, but refer to a microcontroller, a microcomputer, a programmable logic controller (PLC), field programmable gate array, and application specific integrated circuit, and other programmable circuits. Processors, computer, and controllers discussed herein include memory (e.g., a tangible and non-transitory memory) in various embodiments. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, processes or activities described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
an alternating current (AC) power component;
a cable configured to be coupled to the AC power component and configured to conduct current to the AC power component;
a sensor transformer comprising a coil configured to be disposed proximate to the cable and configured to generate an induced voltage responsive to conduction of the current through the cable; and
a sensor configured to be coupled to the sensor transformer and configured to receive sensor power from the sensor transformer, the sensor configured to obtain information corresponding to operation of the AC power component,
wherein the AC power component is configured to adjust the operation of the AC power component based at least partially on a frequency of the AC power component.

2. The system of claim 1, wherein the AC power component is disposed on a vehicle.

3. The system of claim 2, wherein the AC power component is a traction motor of the vehicle.

4. The system of claim 3, wherein the traction motor is part of a drive assembly including the traction motor and a truck, wherein the sensor transformer and sensor are mounted to the drive assembly.

5. The system of claim 1, wherein the sensor transformer defines an opening through which the cable passes.

6. The system of claim 5, wherein the sensor transformer is a split-core transformer.

7. The system of claim 1, wherein the sensor transformer includes a coil configured to be disposed proximate the cable, wherein the cable does not pass through the coil.

8. The system of claim 1, further comprising a band pass filter configured to be interposed between the sensor transformer and the sensor.

9. The system of claim 1, further comprising a storage element coupled to the sensor.

10. The system of claim 1, further comprising a rectifier configured to be interposed between the sensor transformer and the sensor.

11. The system of claim 1, wherein the system is configured to use a harmonic portion of the current passing through the cable.

12. The system of claim 1, wherein the system comprises a plurality of AC power components having associated corresponding sensor transformers, wherein the system is configured to identify a particular AC power component based on a selective provision of power to the particular AC power component.

13. The system of claim 1, wherein the system comprises a plurality of AC power components having associated corresponding sensor transformers, wherein the system is configured to identify a particular AC power component based on a signature frequency of the particular AC power component.

14. The system of claim 1, wherein the sensor is configured to wirelessly communicate with a remote source.

15. The system of claim 1, wherein the sensor is configured to communicate with a remote source via a speed sensor cable.

16. A method comprising:
conducting current to an alternating current (AC) power component via a cable;
generating a sensor power signal with a sensor transformer responsive to the current conducted to the AC power component via the cable;
transmitting the sensor power signal to a sensor;
obtaining information corresponding to operation of the AC power component with the sensor based at least partially on a frequency of the AC power component, and
adjusting operation of the AC power component based at least partially on the frequency of the AC power component.

17. The method of claim 16, further comprising filtering the sensor power signal with a band pass filter interposed between the sensor transformer and the sensor.

18. The method of claim 16, further comprising dissipating excess current of the sensor power signal with a load element coupled to the sensor transformer.

19. The method of claim 16, further comprising storing energy from the sensor power signal with a storage element coupled to the sensor.

20. The method of claim 16, further comprising using a harmonic portion of the current provided to the AC power component to generate the sensor power signal.

21. The method of claim 16, wherein the AC power component comprises a plurality of AC power components having associated corresponding sensor transformers, and wherein the method further comprises identifying a particular AC power component based on a selective provision of power to the particular AC power component.

22. The method of claim 16, wherein the AC power component comprises a plurality of AC power components having associated corresponding sensor transformers, and wherein the method further comprises identifying a particular AC power component based on a signature frequency of the particular AC power component.

23. The method of claim 16, further comprising wirelessly communicating information between the sensor and a remote source via a wireless receiver disposed proximate the AC power component.

24. The method of claim 16, further comprising communicating information between the sensor and a remote source via a speed sensor cable.

25. A system comprising:
a drive assembly including a traction motor;
a cable configured to be coupled to the traction motor and configured to conduct current to the traction motor;
a sensor transformer comprising a coil disposed proximate to the cable and configured to generate an induced voltage responsive to conduction of the current through the cable, the sensor transformer configured to be mounted to the drive assembly proximate the cable; and
a sensor configured to be coupled to the sensor transformer and configured to receive sensor power from the sensor transformer, the sensor configured to be mounted to the drive assembly and configured to obtain information corresponding to operation of the drive assembly,
wherein the drive assembly is configured to adjust the operation of the drive assembly based at least partially on a frequency of the drive assembly.

* * * * *